United States Patent [19]

Buell et al.

[11] 4,017,486
[45] Apr. 12, 1977

[54] CATIONIC ALPHA-CYANO-P-DIMETHYLAMINOCINNAMOYL DYES AND PAPER DYED THEREWITH

[75] Inventors: Bennett George Buell; Frank Fred Loffelman, both of Bridgewater, N.J.

[73] Assignee: American Cyanamid Company, Stamford, Conn.

[22] Filed: May 18, 1976

[21] Appl. No.: 687,492

[52] U.S. Cl. .......................... 260/240.9; 260/240 J; 260/294.9
[51] Int. Cl.² ................. C09B 57/00; C07D 211/00
[58] Field of Search ........... 260/240 J, 240.9, 294.9

[56] References Cited

UNITED STATES PATENTS

| 3,072,648 | 1/1963 | Bonvicino | 260/294.9 X |
| 3,072,649 | 1/1963 | Semb et al. | 260/240 J |
| 3,687,929 | 8/1972 | Ramanathan et al. | 260/240 J X |

FOREIGN PATENTS OR APPLICATIONS 932,343   8/1955   Germany .................. 260/240 J

*Primary Examiner*—Allen B. Curtis
*Attorney, Agent, or Firm*—John L. Sullivan

[57] ABSTRACT

Cationic dyes for paper having the formula:

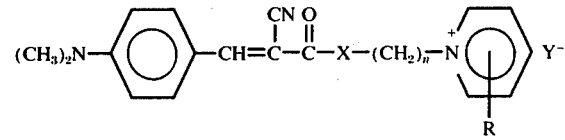

wherein R is selected from hydrogen and methyl, X is selected from O and NH, $n$ is 2 or 3, and $Y^-$ is an anion selected from halide and methosulfate, have improved storage stability in aqueous acid solutions.

5 Claims, No Drawings

CATIONIC ALPHA-CYANO-P-DIMETHYLAMINOCINNAMOYL DYES AND PAPER DYED THEREWITH

This invention relates to novel green-yellow cationic dyes for paper having improved storage stability in aqueous acid solutions. The invention also relates to storage stable aqueous acidic dye compositions, to a process for dyeing paper with said novel dyes, and to paper dyed therewith.

Bauman, in Example 8 of U.S. Pat. No. 3,742,012, discloses that the α-cyano-p-diethylaminocinnamate of 2-hydroxyethyltrimethylammonium chloride, a paper dye, has good storage stability in aqueous acetic acid. It has been found, however, that that dye compound suffers considerable loss in tinctorial strength when applied to paper after storage in aqueous acetic acid solution at about 50° C. for varying periods of time. Since this temperature is commonly encountered in storage of dye solutions in warehouses or in shipment in trailer trucks or railroad cars, particularly during the summer months, there is a definite need for a green-yellow paper dye which is stable in aqueous acetic acid solutions for long periods of time at temperatures of 50° C.

We have now found that structurally similar α-cyano-p-dimethylaminocinnamoyl dye compounds represented by formula I:

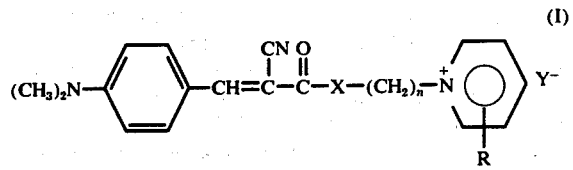

(I)

wherein R is selected from hydrogen or methyl, X is selected from O or NH, n is 2 or 3 and Y⁻ is an anion selected from halide and methosulfate, impart bright green-yellow shades without loss in tinctorial strengths when applied to paper from aqueous acetic acid solutions even after storage at 50° C. for several weeks.

Preferred dyestuffs of this invention are the compounds of formula I wherein X is O, n is 2, and Y⁻ is a chloride, bromide or iodide ion, especially the chloride ion.

The cationic dye compounds of this invention may be prepared by methods which are well-known in the art. Generally, p-dimethylaminobenzaldehyde can be reacted with cyanoacetic acid in solvents such as benzene or isopropanol and the resulting α-cyano-p-dimethylaminocinnamic acid can be converted to the corresponding acid chloride or methyl ester. Either the methyl ester or the acid chloride can then be reacted with a compound having the formula:

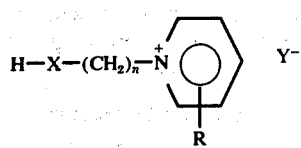

(II)

wherein X, n, R and Y⁻ are as previously defined to obtain the dye compounds of formula I.

The dye compounds of this invention may also be prepared by reacting p-dimethylaminobenzaldehyde with a cyanoacetate or cyanoacetamide having the formula:

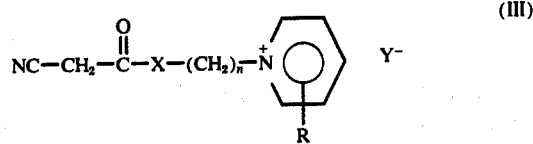

(III)

wherein X, n, R and Y⁻ are as previously defined. Generally, the compounds of formula III may be prepared by reacting cyanoacetic acid with acetic anhydride to form a mixed anhydride in situ and reacting the latter with a compound of formula II. This is followed by in situ condensation of the ester product with p-dimethylaminobenzaldehyde. The reaction mixture may then be diluted with water to obtain a solution of the desired dye compound in acetic acid, which is a preferred form for storage and application of the dye. Alternatively, the dye may be isolated as a solid and subsequently dissolved in aqueous acid solution prior to use. The acids used to prepare such a solution are acetic and formic acid, or mixtures thereof.

Alternatively, the compounds of formula III may be prepared by reacting ethyl cyanoacetate with an alcohol or amine of formula II.

The compounds of formula II wherein X is oxygen may be prepared by reacting pyridine or a methyl-substituted pyridine with an appropriate hydroxyhaloalkane, such as ethylenechlorohydrin, ethylenebromohydrin, 1-chloro-3-hydroxypropane, 1-bromo-3-hydroxypropane, and the like. The compounds of formula II wherein X is nitrogen may be prepared by reacting pyridine with an appropriate aminohaloalkane hydrochloride, such as 1-amino-2-bromoethane hydrochloride or 1-amino-3-chloropropane hydrochloride, to form the corresponding hydrochloride of a 1-(2-aminoethyl)pyridinium bromide or a 1-(3-aminopropyl)pyridinium chloride and subsequently neutralizing said hydrochloride with an alkalizing agent to form the free base. The compounds of formula II wherein Y⁻ is a methosulfate ion may be obtained from the correspondng compound wherein Y⁻ is a halide ion by an exchange reaction with sodium or potassium methosulfate.

Alternatively, the hydroxyhaloalkane, or the free base of the aminohaloalkane hydrochloride, may be reacted with α-cyano-p-dimethylaminocinnamoyl chloride to form a compound having the formula:

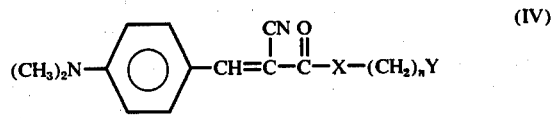

(IV)

wherein X and n are as previously defined and Y is selected from chloro, bromo, or iodo. The compound of formula IV may then be reacted with pyridine or a methyl-substituted pyridine to form a dye compound of formula I wherein Y⁻ is chloride, bromide, or iodide. The latter compound may then be reacted with sodium or potassium methosulfate by exchange to form the corresponding compound where Y⁻ is methosulfate.

The intermediate aldehyde, p-dimethylaminobenzaldehyde, may be prepared from N,N-dimethylaniline by the Vilsmeier-Haack reaction using dimethylformamide and phosphorus oxychloride. [See J. Scientific and Industrial Research, volume 32 (3) 1973 pages 128–149, and G. A. Olah and S. J. Kuhn in Friedel-Crafts and Related Reactions, volume III, part 2 (Interscience Publishers, Inc., New York, 1964), page 1211.] The intermediate aldehyde may also be prepared by the reaction of N,N-dimethylaniline with hexamethylenetetramine and formaldehyde in the presence of an acid as disclosed by Berres et al., British Pat. No. 1,022,741. In an alternative method p-dimethylaminobenzaldehyde may be prepared by heating a mixture of N,N-dimethylaniline, 40% formalin, p-nitroso-N,N-dimethylaniline hydrochloride and 28% sulfuric acid at 90° C. for 2 hours as disclosed by K. Venkataraman, The Chemistry of Synthetic Dyes, Volume I, Academic Press, 1952, page 135.

Illustrative examples of the compounds of formula II which may be used as intermediates for preparing the dye compounds of this invention, or the intermediate compounds of formula III, are the following:

1-(2-hydroxyethyl)pyridinium chloride
1-(2-hydroxyethyl)pyridinium bromide
1-(2-hydroxyethyl)pyridinium methosulfate
1-(2-hydroxyethyl)-2-methylpyridinium chloride
1-(3-hydroxypropyl)pyridinium chloride
1-(3-hydroxypropyl)-3-methylpyridinium chloride
1-(2-aminoethyl)pyridinium chloride
1-(2-aminoethyl)pyridinium bromide
1-(2-aminoethyl)pyridinium methosulfate
1-(2-aminoethyl)-2-methylpyridinium chloride
1-(3-aminopropyl)pyridinium chloride
1-(3-aminopropyl)-3-methylpyridinium chloride The following examples and tests will serve to illustrate the invention. All percentages are by weight unless otherwise indicated.

EXAMPLE 1

Preparation of α-Cyano-p-Dimethylaminocinnamate of 1-(2-Hydroxyethyl)Pyridinium Chloride The acid chloride of α-cyano-p-dimethylaminocinnamic acid was first prepared by reacting α-cyano-p-dimethylaminocinnamic acid (39.7 grams; 0.18 mole) with thionyl chloride (38.5 grams; 0.32 mole) in benzene (440 grams) at reflux while stirring vigorously until all of the solid material dissolved and no further evolution of hydrogen chloride occurred. The benzene and excess thionyl chloride were distilled off under vacuum, the residual acid chloride was dissolved in pyridine (490 grams) and 1-(2-hydroxyethyl)pyridinium chloride (34.5 grams; 0.22 mole) was added thereto. The reaction mixture was then stirred and heated at reflux for ¾ hour and allowed to cool to room temperature to crystallize the product. The resulting crystals were separated by filtration, washed with a little pyridine, then thoroughly washed with toluene and dried at 65° C. to obtain 62.7 grams (97% of theory) of product which melted at 192°–194° C. Recrystallization of the crude product twice from isopropanol gave a product (99.62% pure) which melted at 204°–205° C.

Analysis: Calculated for $C_{19}H_{20}N_3O_2Cl$ (percent): C, 63.77; H, 5.63; N, 11.74; Cl, 9.91. Found (percent): C, 63.14; H, 5.40; N, 11.49; Cl, 9.51.

In a similar manner the acid chloride of α-cyano-p-dimethylaminocinnamic acid may be reacted with 1-(2-hydroxyethyl)-2-methylpyridinium chloride (38.2 grams; 0.22 mole to prepare the α-cyano-p-dimethylaminocinnamate of 1-(2-hydroxyethyl)-2-methylpyridinium chloride.

In a similar manner the acid chloride of α-cyano-p-dimethylaminocinnamic acid may be reacted with 44.89 grams (0.22 mole) of 1-(2-aminoethyl)pyridinium bromide to prepare 1-[2-(α-cyano-p-dimethylaminocinnamido)ethyl] pyridinium bromide.

EXAMPLE 2

Preparation of α-Cyano-p-Diethylaminocinnamate of 1-(2-Hydroxyethyl)Trimethylammonium Chloride A mixture of acetic anhydride (183.0 grams) and 99% cyanoacetic acid (51.0 grams; 0.594 mole) was stirred at 50° C. for 1 hour and cooled to 20° C. To the reaction mixture 99% 1-(2-hydroxyethyl)trimethylammonium chloride (100.0 grams; 0.71 mole) was added and the reaction mixture was stirred at 30° C. for 1 hour. p-(Diethylamino) benzaldehyde (98% real) (106.0 grams; 0.568 mole) was added thereto and the reaction mixture was slowly heated to 80° C., stirred at 80° C. for 5 hours, and allowed to cool to ambient temperature overnight. The reaction mixture was then heated at 80° C. for an additional hour, cooled to 50° C., diluted with 70 grams of water and allowed to cool to ambient temperature.

The cooled solution was diluted with 1500 mls. of isopropanol and diethyl ether was slowly added to the diluted solution to precipitate the product. The crystalline product was separated by filtration, washed with isopropanol and dried at 65° C. to obtain 110.6 grams (53.2% of theoretical; m.p. 210°–212° C. (dec) of crude product. Recrystallization of the crude product from 1100 mls. of isopropanol resulted in recovery of 96.2 grams of product which melted at 215°–216° C. (dec.). The recrystallized material was found to be 99.58% pure by high pressure liquid chromatography.

EVALUATION OF STORED DYE SOLUTIONS

Acetic acid solutions of the dye compounds of Examples 1 and 2 were evaluated for their storage stability by visually comparing the tinctorial strength imparted to dyed paper by the freshly prepared solutions to that imparted after the solutions were stored at 50° C. for periods of 1, 2, and 3 weeks. The solutions had the following compositons:

Solution A: 31.8 parts by weight of the product of Example 1; 31.8 parts by weight of glacial acetic acid and 36.4 parts by weight of distilled water.

Solution B: 31.8 parts by weight of the product of Example 2; 31.8 parts by weight of glacial acetic acid and 36.4 parts by weight of distilled water.

Solution C: 31.8 parts by weight of the product of Example 1 and 68.2 parts by weight of an acid solution consisting of 6.8% water, 6.7% methanol, 39.2% formic acid and 47.3% glacial acetic acid by weight.

Solution D: 31.8 parts by weight of the product of Example 2 and 68.2 parts by weight of the same acid solution used in Solution C.

Dye Test Procedure:

A slurry of 4.0 grams (dry basis) of unbleached sulfite pulp in 300 mls. of water is stirred at room temperature and 10 mls. of a solution of the dye under test, prepared by dissolving 1 gram of the dye solution (A, B, C, or D) in 500 mls. of water, are added thereto. The slurry is then stirred at room temperature for 10 minutes, 1.5 mls. of a 4% rosin solution added, and stirring continued for an additional 10 minutes. To the slurry is then added 3 mls. of a 4% solution of aluminum sulfate and stirring continued for an additional 15 minutes. (The pH of the slurry at this point is 4.5.) The slurry is then filtered on a screen to provide a web which is then pressed on a hydraulic press and dried on a steam roll to form a dyed sheet of paper. The tinctorial strengths of the dyeings thus made with the stored dye solutions were determined by comparison with similar dyeings with the freshly prepared dye solutions rated as 100%.

The test results are shown in Table I. As will be seen from the table, the dyeings made using solutions A and C containing the dye of this invention (Example 1) suffered no loss of strength during storage, whereas those made from solutions B and D containing the dye of the prior art (Example 2) lost considerable strength during storage.

Table I

| Dye Solution | Freshly Prepared | Tinctorial Strength (%) | | |
|---|---|---|---|---|
| | | Stored 1 Week | Stored 2 Weeks | Stored 3 Weeks |
| A | 100 | 100 | 100 | 100 |
| B | 100 | 75 | 75 | 63 |
| C | 100 | 100 | 100 | 100 |
| D | 100 | 88 | 88 | 88 |

We claim:
1. A cationic dye having the formula:

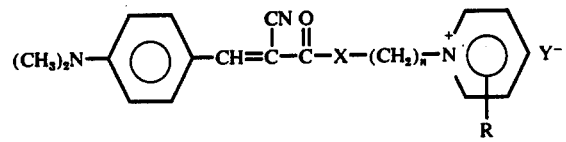

wherein R is selected from hydrogen and methyl, X is selected from O and NH, $n$ is 2 or 3 and $Y^-$ is an anion selected from halide and methosulfate.

2. A dye according to claim 1 wherein X is O.
3. A dye according to claim 1 having the formula:

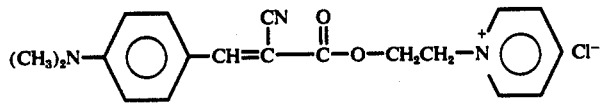

4. Paper dyed with a dye of claim 1.
5. Paper dyed with the dye of claim 3.

* * * * *